(12) United States Patent
Hu et al.

(10) Patent No.: US 9,888,813 B2
(45) Date of Patent: Feb. 13, 2018

(54) DISMOUNTABLE HAND GRIP

(71) Applicant: ZHEJIANG NOVIA INDUSTRY & TRADE CO., LTD, Wu Yi, Zhejiang (CN)

(72) Inventors: Huacheng Hu, Zhejiang (CN); Guoxiang Pan, Zhejiang (CN)

(73) Assignee: ZHEJIANG NOVIA INDUSTRY & TRADE CO., LTD, Wu Yi, Zhejiang (CN)

( * ) Notice: Subject to any disclaimer, the term of this patent is extended or adjusted under 35 U.S.C. 154(b) by 161 days.

(21) Appl. No.: 15/031,267

(22) PCT Filed: Aug. 4, 2015

(86) PCT No.: PCT/CN2015/000545
§ 371 (c)(1),
(2) Date: Apr. 21, 2016

(87) PCT Pub. No.: WO2016/145553
PCT Pub. Date: Sep. 22, 2016

(65) Prior Publication Data
US 2017/0099996 A1    Apr. 13, 2017

(30) Foreign Application Priority Data

Mar. 16, 2015 (CN) .......................... 2015 1 0112419

(51) Int. Cl.
*A47J 45/07* (2006.01)
(52) U.S. Cl.
CPC ............. *A47J 45/07* (2013.01); *A47J 45/071* (2013.01)

(58) Field of Classification Search
CPC ........ A47J 45/07; A47J 45/071; A47J 45/072; A47J 45/077; A47J 45/078; A47J 45/074;
(Continued)

(56) References Cited

U.S. PATENT DOCUMENTS

| 735,516 | A | * | 8/1903 | Horton ................. A47J 45/071 |
| | | | | 220/759 |
| 1,575,576 | A | * | 3/1926 | Guitian .................. A47J 45/10 |
| | | | | 294/27.1 |

(Continued)

FOREIGN PATENT DOCUMENTS

| CN | 104146633 | 11/2014 |
| CN | 104665646 | 6/2015 |

(Continued)

*Primary Examiner* — Jeffrey O Brien

(57) ABSTRACT

A dismountable hand grip include a connection block, a hand grip, two locking pieces, an elastic component and two pins; wherein: there is a connection chamber at a front end of the hand grip; the two locking pieces are both provided inside the connection chamber and symmetrically connected to the front end of the hand grip through a pin respectively, in order to enable themselves to rotate around the pin inside of the connection chamber; there is a clip unit at the front end of the locking piece, and a compression unit is at a back and connected with the hand grip through the elastic component; and wherein a back part of the connection block is provided with a connection unit which is inserted into the connection chamber, wherein the connection unit is provided with a clip slot, which matches with the clip unit.

18 Claims, 3 Drawing Sheets

(58) Field of Classification Search
CPC ........... A47J 45/075; A47J 45/10; B25G 3/18; B25G 3/20; B25G 3/24
USPC ....... 16/422, 425, DIG. 24; 220/759; 30/532
See application file for complete search history.

(56) References Cited

U.S. PATENT DOCUMENTS

| | | | | |
|---|---|---|---|---|
| 1,635,119 | A * | 7/1927 | Dziuba | A47J 45/10 220/759 |
| 1,649,387 | A * | 11/1927 | Brosi | A47J 45/071 220/759 |
| 2,494,159 | A * | 1/1950 | Bernstein | A47J 45/071 220/759 |
| 2,991,111 | A * | 7/1961 | Freiman | A47J 45/06 215/398 |
| 3,285,648 | A * | 11/1966 | Pryce | A47J 45/10 294/33 |
| 4,083,081 | A * | 4/1978 | Witte | A47J 45/071 220/752 |
| 4,577,367 | A * | 3/1986 | Durand | A47J 45/071 16/DIG. 24 |
| 4,761,851 | A * | 8/1988 | Day | A47J 45/071 220/752 |
| 4,782,555 | A * | 11/1988 | Fischbach | A47J 45/071 16/DIG. 24 |
| 5,509,173 | A * | 4/1996 | LaSaosa | A47J 45/071 220/759 |
| 5,555,604 | A * | 9/1996 | Baumgarten | A47J 45/071 220/759 |
| 5,933,918 | A * | 8/1999 | Wallays | A47J 45/071 16/114.1 |
| 6,341,714 | B1 * | 1/2002 | Bogani | A47J 45/071 16/425 |
| 6,439,421 | B1 * | 8/2002 | Lin | A47J 45/071 16/425 |
| 6,824,180 | B2 * | 11/2004 | Tomchak | A01B 1/22 15/145 |
| 7,028,374 | B2 * | 4/2006 | Fiocco | A47J 45/071 16/422 |
| 8,075,551 | B2 * | 12/2011 | Eberle | A61B 17/00 285/88 |
| 8,302,807 | B2 * | 11/2012 | Baumgarten | A47J 45/071 16/425 |
| 8,484,805 | B2 * | 7/2013 | Munari | A47J 45/071 16/422 |
| 8,573,438 | B1 * | 11/2013 | Cheng | A47J 45/071 16/422 |
| 8,650,993 | B2 * | 2/2014 | Chen | B25G 3/18 81/487 |
| 8,915,396 | B2 * | 12/2014 | Lorthioir | A47J 45/10 16/422 |
| 9,072,408 | B2 * | 7/2015 | Baumgarten | A47J 45/071 |
| 9,131,808 | B2 * | 9/2015 | Bonnel | A47J 45/071 |
| 9,565,973 | B2 * | 2/2017 | Paul | A47J 45/071 |
| 2003/0061718 | A1 * | 4/2003 | Dansreau | B26B 21/225 30/532 |
| 2010/0263219 | A1 * | 10/2010 | Kempker | B25F 1/02 30/337 |
| 2011/0094062 | A1 * | 4/2011 | Pasquini | A47J 45/061 16/430 |
| 2012/0225178 | A1 * | 9/2012 | Degnan | A47J 45/071 426/523 |
| 2015/0053696 | A1 * | 2/2015 | Borovicka | A47J 45/071 220/573.1 |
| 2017/0190042 | A1 * | 7/2017 | Yu | B25G 3/18 |
| 2017/0224154 | A1 * | 8/2017 | Compeau | A47J 36/2483 |
| 2017/0280940 | A1 * | 10/2017 | Quinn | A47J 45/07 |
| 2017/0319012 | A1 * | 11/2017 | Dodane | A47J 45/071 |

FOREIGN PATENT DOCUMENTS

| | | |
|---|---|---|
| CN | 104739277 | 7/2015 |
| CN | 204500441 | 7/2015 |
| CN | 204500442 | 7/2015 |
| CN | 2748011 | 12/2015 |
| JP | 3067853 | 9/1999 |

* cited by examiner

DISMOUNTABLE HAND GRIP

CROSS REFERENCE OF RELATED APPLICATION

This is a U.S. National Stage under 35 U.S.C 371 of the International Application PCT/CN2015/000545, filed Aug. 3, 2015, which claims priority under 35 U.S.C. 119(a-d) to CN 201510112419.0, filed Mar. 16, 2015.

BACKGROUND OF THE PRESENT INVENTION

Field of Invention

The present invention relates to cookware and similar kitchenware or accessories of containers, particularly a dismountable hand grip.

Description of Related Arts

Kitchenware used for cooking, such as wok, usually comprises a body and a long hand grip connected to the body side. The long grip is normally fixed on the body, which is inconvenient to be dismantled. In addition, the extended part enlarges the volume of cookware parcel. The increased volume requires space during transportation and storage, which increases transportation, storage and packaging costs.

Therefore, the dismountable cookware hand grip has been invented. The Chinese patent application discloses (public number: CN104146633A) a kind of dismountable hand grip for cookware. The dismountable hand grip includes a body connecting piece and a grip which is dismountable from the body connecting piece, wherein: said grip is provided with a receiving groove. The receiving groove is used for placing the control rod which is used for disassembly or assembly of the grip to the connecting piece. The head of the control rod is in cam shape, and is connected with, through a pin shaft, with the grip head that are located at both sides of the holding tank, in order to enable the control rod to rotate around the pin shaft; there is a location hole provided vertically at the end of the mentioned body fastenings. Locking piece located in the holding tank is provided under the head of the control rod. The bottom center of the locking piece forms a protrusion. Between the bottom of the locking piece and the grip, there is at least one reset spring located at one side of the protrusion. Said reset spring is vertically located under the holding slot. The head of the grip is provided with a horizontal insertion slot for the back end of the body connecting piece to insert, wherein the horizontal insertion slot is connected with the bottom of the receiving groove. By utilizing the horizontal inserted slot, said body connecting piece inserts into the grip head. When the control rod is placed inside of the holding slot, the distance between the joint area that connects the control rod head and the locking piece, and the coupling area that contacts the grip head reaches to the maximum, the control rod head presses the locking piece and makes the protrusion locate inside of the location hole completely, the reset spring is compressed, and the end of the body connecting piece is locked; Under the circumstances that the control rod utilizes external force for rotating the pin shaft until it gets to the outside of the holding slot, and meanwhile the distance between the joint area that connects the control rod head and the locking piece, and the coupling area that contacts the grip head reaches to the minimum, the reset spring restores the locking piece and makes the protrusion locate outside of the location hole, the end of the body fastening is unlocked. Thus it could be seen that this technology completes disassembly or assembly between the connecting rod and grip by means of operating the control rod.

However, the following technical problems are found during the process of using the above-mentioned structure:

Problem One: Such structure requires both hands to operate. One hand is for operating the control rod, and the other is for holding the grip. Meanwhile, the assembly positions to the body connecting rod and grip shall be taken into consideration simultaneously. People will find it difficult to operate. Moreover, it takes long time to dissemble or assemble.

Problem Two: After the assembly is finished, since the connecting area between the body connecting rod and grip is mainly locked inside of the location hole by depending on the protrusion on the head locking piece, the joint point is relatively single, and the joint point is easy to waggle. Particularly the waggle at the joint point would be more obvious after long time use, and there exists even the risk that the pan is falling down during usage.

Problem Three: Since the control rod of such a structure is extended to the outside of the grip, not only the grip volume has been enlarged, but also the grip could be seemed inaesthetic.

SUMMARY OF THE PRESENT INVENTION

An object of the present invention is to provide a dismountable hand grip. The technical problems to be solved are as follows: 1) The conventional dismountable hand grips cannot be assembled and disassembled with single hand. 2) The conventional dismountable handgrips only feature single connection point after being assembled and therefore the conventional dismountable handgrips waggle easily during usage. A product of the present invention is featured by a simple structure, convenient operation, secure and stableness, high durability and so forth.

The present invention provides the following technical solution:

A dismountable hand grip, comprising a connection block and a hand grip; wherein the dismountable hand grip further comprises two locking pieces, an elastic component and two pins; wherein a front part of the hand grip is provided with a connection chamber, the two locking pieces are both located inside the connection chamber and are symmetrically connected to the front end of the hand grip through the two pins respectively in order to enable the locking pieces to rotate around the pins inside the connection chamber; and wherein a front part of each of the locking pieces is provided with a clip unit, and a back part of each of the locking pieces is a compression unit which is connected with the hand grip through the elastic component; and wherein a back part of the connection block is provided with a connection unit which is inserted into the connection chamber, wherein the connection unit is provided with a clip slot, which matches with the clip unit.

Said dismountable hand grip is characterized in that each side of a central axis is provided with an elastic component respectively, and the outer end of the elastic component is connected with the back part of each of the locking pieces, and an inner end of the elastic component is connected to an fixing unit at both sides of the central axis of the hand grip.

Said dismountable hand grip is characterized in that the back part of each of the locking pieces is provided with a first fixing hole of the elastic component for connecting the outer end of the elastic component, and each side of the hand grip is provided with a second fixing hole of the elastic component for connecting the inner end of the elastic component.

Said hand grip is characterized in that the front end of the hand grip is provided with two guiding slots of the connection block respectively wherein the two guiding slots are separated by a reinforcing plate; and correspondingly, the connection unit at the back part of the connection block is two guiding orientation columns whose positions match with the two guiding slots of the connection block, wherein outsides of the guiding orientation columns are each provided with the clip slot respectively and there exists a fixing gap between the two guiding orientation columns for the reinforcing plate to insert, and during usage the reinforcing plate at front part of the hand grip is inserted into the fixing gap between the two guiding orientation columns, so as to increase a combination stability between the hand grip and the connection block.

Said dismountable hand grip is characterized in that wherein an outside of the two grinding slots of the connection block of the hand grip is provided with a fixing step, wherein the fixing step increases the combination stability between the hand grip and the connection block together with an outer edge of the connection block.

Said dismountable hand grip is characterized in that the front end of the hand grip is provided with the two guiding slots of the connection block respectively, wherein the two guiding slots are separated by the reinforcing plate; and correspondingly, the connection unit at the back part of the connection block is the two guiding orientation columns whose positions match with the two guiding slots of the connection block, wherein the outsides of the orientation columns are each provided with the clip slot respectively and there exists the fixing gap between the two guiding orientation columns for the reinforcing plate to insert; and during usage, the reinforcing plate at the front part of the hand grip is inserted into the fixing gap between the two guiding orientation columns, so as to increase the combination stability between the hand grip and the connection block. The dismountable hand grip is characterized in that the outside of the two guiding slots of the connection block of the dismountable hand grip is provided with a fixing step, wherein the fixing step increases the combination stability between the hand grip and the connection block together with the outer edge of the connection block.

Said dismountable hand grip is characterized in that a bottom of the clip unit of the locking piece is provided with a fastening convex unit, wherein the fastening convex unit matches with a fastening slot around a clip slot top set on the connection block for ensuring the degree of combining steadiness between the hand grip and the connection block.

Said dismountable hand grip has following characteristics: Behind the connection unit of the connection block there are two guiding orientation columns that are placed symmetrically to the two guide slots of the connection blocks, wherein the outside of the two guiding orientation columns is provided with a fastening slope, wherein the fastening slope reinforces the degree of the combining steadiness between the hand grip and the connection block by matching with a fastening angle plane at a pin connection area on the locking pieces.

Said dismountable hand grip is characterized in that the bottom of the clip unit of the locking piece is provided with the fastening convex unit, wherein the fastening convex unit matches with the fastening slot around the clip slot top set on the connection block for ensuring the degree of the combining steadiness between the hand grip and the connection block. Behind the connection unit of the connection block there are two guiding orientation columns that are placed symmetrically to the two guide slots of the connection block, wherein the outside of top side of the two guiding orientation columns is provided with the fastening slope, wherein the fastening slope reinforces the degree of combining steadiness between the hand grip and the connection block by matching with the fastening angle plane at the pin connection area on the locking pieces.

Said dismountable hand grip is characterized in that the front end of the hand grip is provided with two guiding slots of the connection block respectively wherein the two guiding slots are separated by a reinforcing plate; and correspondingly, the connection unit at the back part of the connection block is two guiding orientation columns whose positions match with the two guiding slots of the connection block, wherein outsides of the guiding orientation columns are each provided with the clip slot respectively and there exists a fixing gap between the two guiding orientation columns for the reinforcing plate to insert and during usage, the reinforcing plate at the front part of the hand grip is inserted into the fixing gap between the two guiding orientation columns, so as to increase the combination stability between the hand grip and the connection block, and wherein an outside of the two guiding slots of the connection block of the dismountable hand grip is provided with a fixing step, wherein the fixing step increases the combination stability between the hand grip and the connection block together with an outer edge of the connection block, and wherein a bottom of the clip unit of the locking piece is provided with a fastening convex unit, wherein the fastening convex unit matches with a fastening slot around a clip slot top set on the connection block for ensuring a degree of combining steadiness between the hand grip and the connection block, and wherein an outside of a top side of the two guiding orientation columns is provided with a fastening slope, wherein the fastening slope reinforces a degree of combining steadiness between the hand grip and the connection block by matching with the fastening angle plane at a pin connection area on a locking pieces.

The advantages of the present invention lie in:

1. The structure of the hand grip of the present invention enables assembling and disassembling the hand grip and connection block be completed by one hand. The operation is very convenient, quick and labor-saving.

2. Both locking pieces of the present invention are provided inside of the connection chamber at the front part of the hand grip (the front part of the locking piece would slightly reveal hand grip surface only by pressing). Compared to the technology in the prior art, not only the volume of the hand grip is not increased, but also the aesthetic value of the product is not reduced.

3. Besides the fastening unit, namely the clip unit of the locking piece matches with clip slot of the connection unit on the connection block, there are many other additional fastening units that could be used separately or comprehensively. During usage, it could be found that the shaking problem between the hand grip and connection block could be avoided thoroughly, and thus the usage security could be increased.

DETAILED DESCRIPTION OF THE
PREFERRED EMBODIMENT

Figure 1:
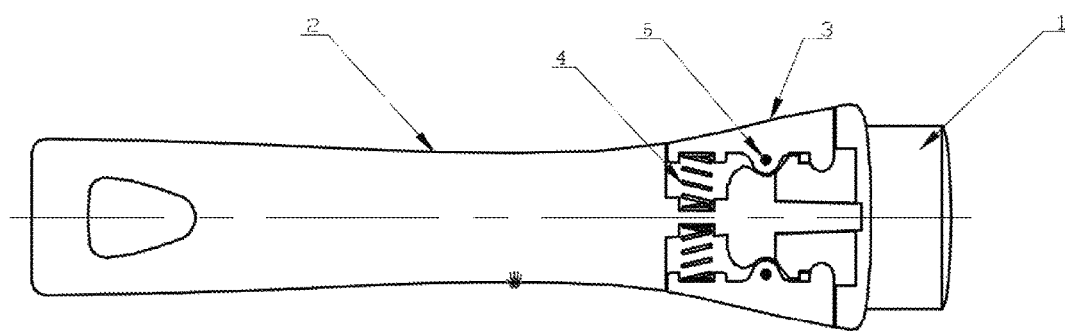
FIG. 1 is a structural diagram of a dismountable hand grip of the present invention.

FIG. 1 is a structural diagram of a dismountable hand grip of the present invention. As shown in the figures: the dismountable hand grip comprises a connection block 1, a hand grip 2, two locking pieces 3, an elastic component 4 and two pins 5. There is a connection chamber at a front part of the hand grip 2. The two locking pieces 3 are set inside the connection chamber and are symmetrically connected to the front part of the hand grip 2 through the pins 5, in order to enable the locking piece 3 to rotate around pins 5 inside the connection chamber. There is a clip unit 31 at the front part of the locking pieces 3, and a pressing unit is provided at a back part of the locking pieces 3 and is connected with the hand grip 2 via the elastic component 4. At the back part of the connection block 1, there is a connection unit which is able to be inserted into the connection chamber. The connection unit is provided with a clip slot 12 which corresponds with the clip unit 31.

During a process of assembly, use two fingers of one hand (such as the thumb and the index finger) to press pressing areas of the two locking pieces 3 (back end) respectively. At this moment, the elastic component 4 between the pressing areas contracts towards a central axis of the hand grip 2, and also the front parts of the two locking pieces 3 assume an opening state at the same time. Then, wrap the back part of the connection block 1 into the connection chamber of the front part of the hand grip 2, and then release the pressing area. At this moment, through an elastic restoring force of the elastic component 4, the two clip units 31 at the front part of the locking pieces 3 will be blocked inside of the clip slot 12 of the connection unit at the back of the connection block 1 respectively. Therefore, assembling hand grip 2 and connection block 1 are able to be realized by one hand effortlessly and conveniently.

During a process of disassembly, use two fingers of one hand (such as the thumb and the index finger) to press the pressing areas of the two locking pieces 3 (back end) respectively. At this moment, the elastic component 4 between the pressing areas contracts towards the central axis of the hand grip 2, and the front parts of the two locking pieces 3 assume an opening state. At this moment, the clip units 31 at the front part of the two locking pieces 3 separate from the clip slot 12 of the connection unit at the back part of the connection block 1 respectively. Next, separate the back end of the connection block 1 from the connection chamber at the front end of the hand grip 2. Consequently, disassembling hand grip 2 and connection block 1 are able to be realized by one hand effortlessly and conveniently.

While realizing simple operation by one hand, it has also been found that both the locking pieces 3 of the present invention are located inside the connection chamber at the front end of the hand grip 2 (the front end of the locking pieces 3 would slightly reveal hand grip surface only during pressing). Compared to the technology in prior art, not only a volume of the hand grip 2 of the present invention is not increased, but also an aesthetic value of a product has not been reduced.

Figure 2:
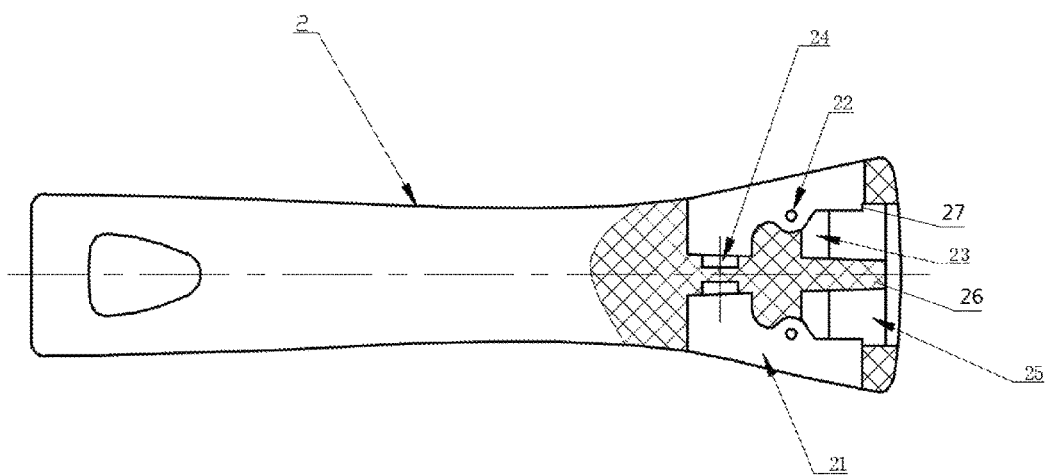
FIG. 2 is a structural diagram of a hand grip of the present invention.

FIG. 2 shows a preferred embodiment of the present invention. Said elastic component 4 (such as the spring) is provided at both sides of the central axis of the hand grip 2 respectively. In this way, the pressing force will be more balanced when the locking piece 3 is operated. In addition, the entire outer end of the elastic component 4 is connected with the back part of the locking piece 3, and the entire inner end of the elastic component 4 is fixed to a fixation area of both sides of the central axis on the hand grip 2. At the back part of the locking piece 3, the fixing hole 32 of the elastic component 4 is able to be provided for connecting the outer part of the elastic component 4. The fixing hole 24 of the elastic component 4 is also provided on both sides of the hand grip 2 for connecting the inner end of the elastic component 4.

As an option, the fixing holes 24 and 32 of the elastic component are also able to be replaced with a fixing column, or other fixing structures.

Of course in case only one elastic component 4 is used, and meanwhile both sides of the elastic component 4 are fixed on the back part of both locking pieces 3, the objective of the present invention can also be realized. The only thing should be concerned is that while pressing, the balance of the pressing force shall be considered. If the balance needs to be achieved, it is apparent that requirements for the elastic component 4 are relatively high.

According to FIG. 2, both sides of the front part of the hand grip 2 are provided with a pin hole 22 for inserting the pin 5. In addition, there is the fixing hole 21 and a locating slot 25 of the locking piece 3 for assembling and locating the locking piece 3.

Figure 3:
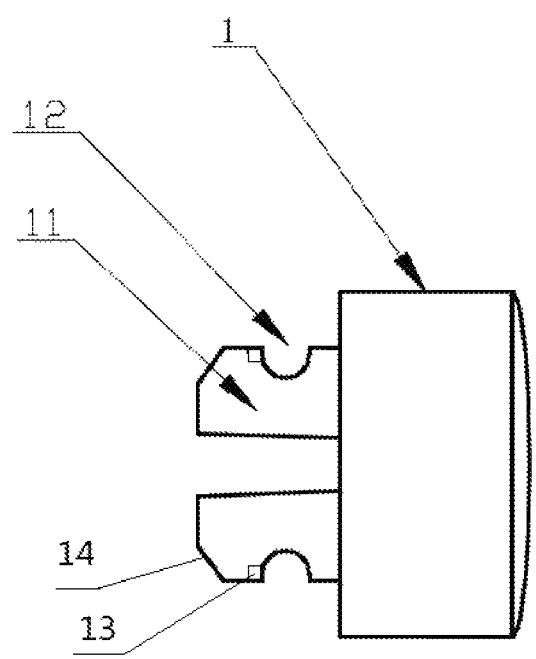
FIG. 3 is a structural diagram of a connection block of the present invention.

A convenient implementation structure for assembling and disassembling of the present invention is described as above. Based on the above-mentioned implementation structure, waggle problem between the hand grip and the connection block is also further considered, detailed implementation structure is as below:

As mentioned above, the clip units 31 at the front part of the two locking pieces 3 are blocked inside the clip slot 12 on the connection unit at a back of the connection block 1, which realizes the first clip fastening structure between the hand grip 2 and the connection block 1. However, problems like unstable fastening and waggling in prior art still exist. These problems are solved as follows:

Additional fastening unit one: according to FIGS. 1, 2 and 3, two guiding slots 25 of the connection block 1 are provided at the front part of the hand grip 2, and the two guiding slots 25 of the connection block 1 are separated by utilizing a reinforcing plate 26. Correspondingly, two guiding orientation columns 11 which match with the two guiding slots 25 of the connection block 1 are located behind the connection unit of the connection block 1 (clip slot 12 is set outside such guiding orientation columns 11 respectively). Between the two guiding orientation columns 11, there is a fixing gap for the reinforcing plate 26 to insert. During usage, the reinforcing plate 26 at the front part of the hand grip 2 is inserted into the fixing gap between two guiding orientation columns 11 of the connection block 1, so as to enhance the degree of combining steadiness between the hand grip 2 and the connection block 1.

Functions of such reinforcing plate 26 are mainly reflected in: (1) The reinforcing plate 26 separates the two guiding slot 25 of the two connection blocks. (2) The reinforcing plate 26 is provided inside the connection chamber in order to enhance the strength of the connection chamber. (3) The reinforcing plate 26 plays a guiding role for the orientation column 11 to insert into the guiding slot of the connection block.

As a preferred embodiment: The reinforcing plate 26 is provided with a slope on both sides. A form between the two slopes is narrow outside and wide inside. Correspondingly, the fixing gap between the guiding orientation columns 11 is also narrow outside and wide inside. In this way, the degree of combining steadiness between hand grip 2 and the connection block 1 is able to be further reinforced.

Additional fastening unit two: According to FIGS. 1, 2 and 3, the outside of the two guiding slots 25 of the connection block of the hand grip 2 are provided with the fixing step 27. Such fixing step 27 matches with an edge of the connection block 1 to reinforce the degree of combining steadiness.

Figure 4:
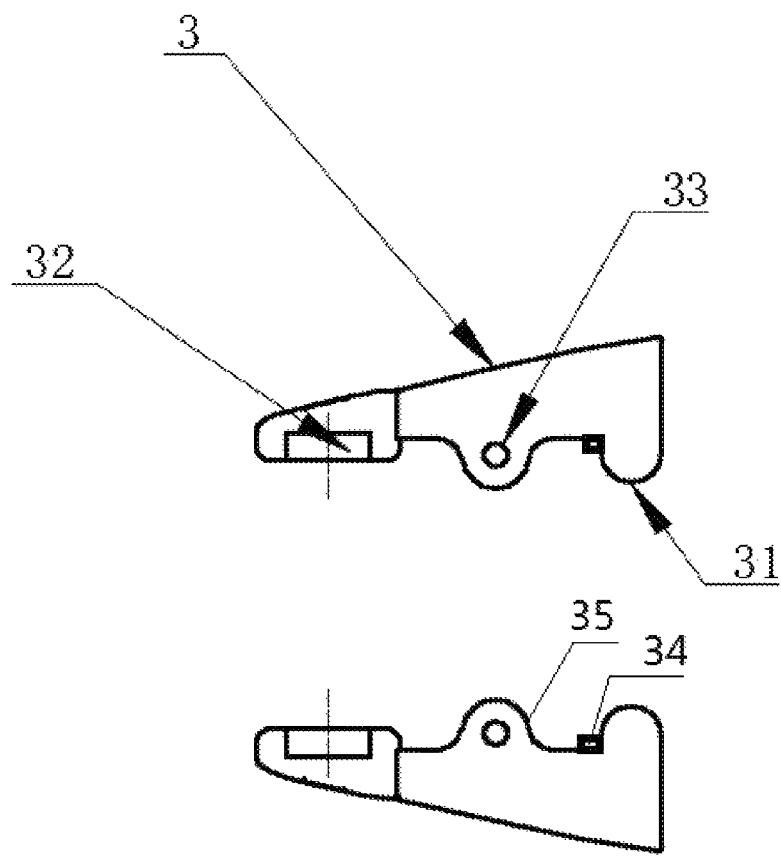
FIG. 4 is a structural diagram of locking pieces of the present invention.

Additional fastening unit three: According to FIGS. 1, 3 and 4, a fastening convex unit 34 is located at a root of the clip unit 31 of the locking piece 3. The fastening convex unit 34 cooperates with the fastening slot 13 around the clip slot top of the connection block 1 to reinforce the degree of combining steadiness between the hand grip 2 and the connection block 1.

Additional fastening unit four: According to FIGS. 1, 3 and 4, the outside of the top of the two guiding orientation columns 11 is provided with the fastening slope 14. The fastening slope 14 cooperates with the fastening slope 35 at a pin joint on the locking piece 3 to reinforce the degree of combining steadiness between the hand grip 2 and the connection block 1.

During practical usage, the four additional fastening units mentioned above are able to be used separately or in combination. No matter under what kind of situation, they will play a role in solving the waggle problem between the hand grip and the connection block. Generally, the additional fastening unit one will be mainly considered to be used together with the additional fastening unit two, or the additional fastening unit three will be considered to be used together with the additional fastening unit four. Through tests, it is found that a best implementation mode for the present invention is to use the four additional fastening pieces mentioned above altogether.

What is claimed is:

1. A dismountable hand grip, comprising a connection block and a hand grip, wherein the dismountable hand grip further comprises two locking pieces, an elastic component and two pins; wherein a front part of the hand grip is provided with a connection chamber, the two locking pieces are both located inside the connection chamber and are symmetrically connected to a front end of the hand grip through the pins respectively, in order to enable the locking pieces to rotate around the pins inside the connection chamber; and wherein a front part of each of the locking pieces is provided with a clip unit, and a back part of each of the locking pieces is a compression unit which is connected with the hand grip through the elastic component; and wherein a back part of the connection block is provided with a connection unit which is inserted into the connection chamber, wherein the connection unit is provided with a pair of clip slots, which each match with one of the respective clip units, for holding the connection unit between the two locking pieces.

2. The dismountable hand grip according to claim 1, wherein each side of a central axis of the hand grip is provided with the elastic component respectively, and an outer end of the elastic component is connected with the back part of each of the locking pieces, and an inner end to the elastic component is connected to a fixing unit at both sides of the central axis of the hand grip.

3. The dismountable hand grip according to claim 2, wherein the back part of each of the locking pieces is provided with a first fixing hole for connecting the outer end of the elastic component, and each side of the hand grip is provided with a second fixing hole for connecting the inner end of the elastic component.

4. The dismountable hand grip according to claim 1, wherein the front end of the hand grip is provided with two guiding slots wherein the two guiding slots are separated by a reinforcing plate; and correspondingly the connection unit at the back part of the connection block is formed as two guiding orientation columns whose positions match with the two guiding slots, wherein outsides of the guiding orientation columns are each provided with one of the clip slots respectively and there exists a fixing gap between the two guiding orientation columns for the reinforcing plate to be inserted, and during usage, the reinforcing plate at the front part of the hand grip is inserted into the fixing gap between the two guiding orientation columns, so as to increase a combination stability between the hand grip and the connection block.

5. The dismountable hand grip according to claim 2, wherein the front end of the hand grip is provided with two guiding slots wherein the two guiding slots are separated by a reinforcing plate; and correspondingly the connection unit at the back part of the connection block is formed as two guiding orientation columns whose positions match with the two guiding slots, wherein outsides of the guiding orientation columns are each provided with one of the clip slots respectively and there exists a fixing gap between the two guiding orientation columns for the reinforcing plate to be inserted, and during usage, the reinforcing plate at the front part of the hand grip is inserted into the fixing gap between the two guiding orientation columns, so as to increase a combination stability between the hand grip and the connection block.

6. The dismountable hand grip according to claim 3, wherein the front end of the hand grip is provided with two guiding slots wherein the two guiding slots are separated by a reinforcing plate; and correspondingly the connection unit at the back part of the connection block is formed as two guiding orientation columns whose positions match with the two guiding slots, wherein outsides of the guiding orientation columns are each provided with one of the clip slots respectively and there exists a fixing gap between the two guiding orientation columns for the reinforcing plate to be inserted, and during usage, the reinforcing plate at the front part of the hand grip is inserted into the fixing gap between the two guiding orientation columns, so as to increase a combination stability between the hand grip and the connection block.

7. The dismountable hand grip according to claim 4, wherein an outside of the two guiding slots is provided with a fixing step, wherein the fixing step increases the combination stability between the hand grip and the connection block together with an outer edge of the connection block.

8. The dismountable hand grip according to claim 5, wherein an outside of the two guiding slots is provided with a fixing step, wherein the fixing step increases the combination stability between the hand grip and the connection block together with an outer edge of the connection block.

9. The dismountable hand grip according to claim 6, wherein an outside of the two guiding slots is provided with a fixing step, wherein the fixing step increases the combination stability between the hand grip and the connection block together with an outer edge of the connection block.

10. The dismountable hand grip according to claim 1, wherein a bottom of each clip unit of the respective locking piece is provided with a fastening convex unit, wherein the fastening convex unit matches with a fastening slot around a top of each respective clip slot set on the connection block for ensuring a degree of combining steadiness between the hand grip and the connection block.

11. The dismountable hand grip according to claim 2, wherein a bottom of each clip unit of the respective locking piece is provided with a fastening convex unit, wherein the fastening convex unit matches with a fastening slot around a top of each respective clip slot set on the connection block for ensuring a degree of combining steadiness between the hand grip and the connection block.

12. The dismountable hand grip according to claim 3, wherein a bottom of each clip unit of the respective locking piece is provided with a fastening convex unit, wherein the fastening convex unit matches with a fastening slot around a top of each respective clip slot set on the connection block for ensuring a degree of combining steadiness between the hand grip and the connection block.

13. The dismountable hand grip according to claim 4, wherein an outside of a top side of the two guiding orientation columns is provided with a fastening slope, wherein the fastening slope reinforces a degree of combining steadiness between the hand grip and the connection block by matching with a fastening angle plane at a pin connection area on the locking pieces.

14. The dismountable hand grip according to claim 5, wherein an outside of a top side of the two guiding orientation columns is provided with a fastening slope, wherein the fastening slope reinforces a degree of combining steadiness between the hand grip and the connection block by matching with a fastening angle plane at a pin connection area on the locking pieces.

15. The dismountable hand grip according to claim 6, wherein an outside of a top side of the two guiding orientation columns is provided with a fastening slope, wherein the fastening slope reinforces a degree of combining steadiness between the hand grip and the connection block by matching with a fastening angle plane at a pin connection area on the locking pieces.

16. The dismountable hand grip according to claim 1, wherein the front end of the hand grip is provided with two guiding slots wherein the two guiding slots are separated by a reinforcing plate; and correspondingly, the connection unit at the back part of the connection block is formed as two guiding orientation columns whose positions match with the two guiding slots, wherein outsides of the guiding orientation columns are each provided with one of the clip slots respectively and there exists a fixing gap between the two guiding orientation columns for the reinforcing plate to be inserted and during usage, the reinforcing plate at the front part of the hand grip is inserted into the fixing gap between the two guiding orientation columns, so as to increase the combination stability between the hand grip and the connection block, and wherein an outside of the two guiding slots is provided with a fixing step, wherein the fixing step increases the combination stability between the hand grip and the connection block together with an outer edge of the connection block, and wherein a bottom of each clip unit of the respective locking piece is provided with a fastening convex unit, wherein the fastening convex unit matches with a fastening slot around a top of each respective clip slot set on the connection block for ensuring a degree of combining steadiness between the hand grip and the connection block, and wherein an outside of a top side of the two guiding orientation columns is provided with a fastening slope, wherein the fastening slope reinforces a degree of combining steadiness between the hand grip and the connection block by matching with the fastening angle plane at a pin connection area on the locking pieces.

17. The dismountable hand grip according to claim 2, wherein the front end of the hand grip is provided with two guiding slots wherein the two guiding slots are separated by a reinforcing plate; and correspondingly, the connection unit at the back part of the connection block is formed as two guiding orientation columns whose positions match with the two guiding slots, wherein outsides of the guiding orientation columns are each provided with one of the clip slots respectively and there exists a fixing gap between the two guiding orientation columns for the reinforcing plate to be inserted and during usage, the reinforcing plate at the front part of the hand grip is inserted into the fixing gap between the two guiding orientation columns, so as to increase the combination stability between the hand grip and the connection block, and wherein an outside of the two guiding slots is provided with a fixing step, wherein the fixing step increases the combination stability between the hand grip and the connection block together with an outer edge of the connection block, and wherein a bottom of each clip unit of the respective locking piece is provided with a fastening convex unit, wherein the fastening convex unit matches with a fastening slot around a top of each respective clip slot set on the connection block for ensuring a degree of combining steadiness between the hand grip and the connection block, and wherein an outside of a top side of the two guiding orientation columns is provided with a fastening slope, wherein the fastening slope reinforces a degree of combining steadiness between the hand grip and the connection block by matching with the fastening angle plane at a pin connection area on the locking pieces.

18. The dismountable hand grip according to claim 3, wherein the front end of the hand grip is provided with two guiding slots wherein the two guiding slots are separated by a reinforcing plate; and correspondingly, the connection unit at the back part of the connection block is formed as two guiding orientation columns whose positions match with the two guiding slots, wherein outsides of the guiding orientation columns are each provided with one of the clip slots respectively and there exists a fixing gap between the two guiding orientation columns for the reinforcing plate to be inserted and during usage, the reinforcing plate at the front part of the hand grip is inserted into the fixing gap between the two guiding orientation columns, so as to increase the combination stability between the hand grip and the connection block, and wherein an outside of the two guiding slots is provided with a fixing step, wherein the fixing step increases the combination stability between the hand grip and the connection block together with an outer edge of the connection block, and wherein a bottom of each clip unit of the respective locking piece is provided with a fastening convex unit, wherein the fastening convex unit matches with a fastening slot around a top of each respective clip slot set on the connection block for ensuring a degree of combining steadiness between the hand grip and the connection block, and wherein an outside of a top side of the two guiding orientation columns is provided with a fastening slope, wherein the fastening slope reinforces a degree of combining steadiness between the hand grip and the connection block by matching with the fastening angle plane at a pin connection area on the locking pieces.

\* \* \* \* \*